(12) United States Patent
Chen et al.

(10) Patent No.: US 9,547,130 B1
(45) Date of Patent: Jan. 17, 2017

(54) DYNAMIC VARIABLE OPTICAL ATTENUATOR WITH DUAL DIRECTIONAL TAPPING

(71) Applicant: Verizon Patent and Licensing Inc., Arlington, VA (US)

(72) Inventors: David Z. Chen, Dallas, TX (US); Wenjia Wang, Westborough, MS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/941,251

(22) Filed: Nov. 13, 2015

(51) Int. Cl.
*G02B 6/26* (2006.01)
*G02B 6/28* (2006.01)
*G02B 6/02* (2006.01)

(52) U.S. Cl.
CPC ............ *G02B 6/266* (2013.01); *G02B 6/2852* (2013.01); *G02B 6/02395* (2013.01)

(58) Field of Classification Search
None
See application file for complete search history.

(56) References Cited

U.S. PATENT DOCUMENTS

| | | | | | |
|---|---|---|---|---|---|
| 4,557,550 A | * | 12/1985 | Beals | ............. | G02B 6/266 250/227.16 |
| 4,887,879 A | * | 12/1989 | Prucnal | ............. | G02B 6/14 385/48 |
| 5,311,614 A | * | 5/1994 | Caron | ............. | G02B 6/266 385/140 |
| 5,319,734 A | * | 6/1994 | Buzzetti | ............. | G02B 6/266 385/134 |
| 5,677,977 A | * | 10/1997 | Smith | ............. | G02B 6/266 385/140 |
| 5,684,912 A | * | 11/1997 | Slaney | ............. | G02B 6/266 385/140 |
| 6,456,775 B1 | * | 9/2002 | Johnson | ............. | G02B 6/266 385/140 |
| 2003/0175001 A1 | * | 9/2003 | Lawrence | ............. | G02B 6/266 385/140 |

* cited by examiner

*Primary Examiner* — Jerry Rahll (57) ABSTRACT

An attenuator device includes a housing that forms a channel configured to receive an optical fiber. The optical fiber includes a first fused fiber tap for a first signal direction and a second fused fiber tap for a second signal direction. The attenuator device also includes (a) a first bend control region, in series with the channel and aligned with the first fused fiber tap; (b) a first bend-inducing object that moves to selectively contact the first fused fiber tap in the first bend control region to alter a bend radius at the first fused fiber tap; (c) a second bend control region, in series with the channel and aligned with the second fused fiber tap; and (d) a second bend-inducing object that moves to selectively contact the second fused fiber tap in the second bend control region to alter a bend radius at the second fused fiber tap.

20 Claims, 11 Drawing Sheets

DYNAMIC VARIABLE OPTICAL ATTENUATOR WITH DUAL DIRECTIONAL TAPPING

BACKGROUND

Optical data networks are increasingly being used for a variety of implementations, such as Ultra Long Haul (ULH) networks, Metro networks, and local access networks. With these increased uses, it is becoming increasingly important to ensure that provisioned equipment meets the requirements and expectations for each particular use.

DETAILED DESCRIPTION OF PREFERRED EMBODIMENTS

The following detailed description refers to the accompanying drawings. The same reference numbers in different drawings may identify the same or similar elements.

Systems described herein provide for dynamic variable optical attenuation with dual directional tapping of an optical link.

According to an implementation described herein, an attenuator device may include a housing that forms a channel to receive an optical fiber. The optical fiber may include a first fused fiber tap for a first signal direction and a second fused fiber tap for a second signal direction. The attenuator device may also include (a) a first bend control region, in series with the channel and aligned with the first fused fiber tap; (b) a first bend-inducing object that moves to selectively contact the first fused fiber tap in the first bend control region to alter a bend radius at the first fused fiber tap; (c) a second bend control region, in series with the channel and aligned with the second fused fiber tap; and (d) a second bend-inducing object that moves to selectively contact the second fused fiber tap in the second bend control region to alter a bend radius at the second fused fiber tap.

Figure 1:
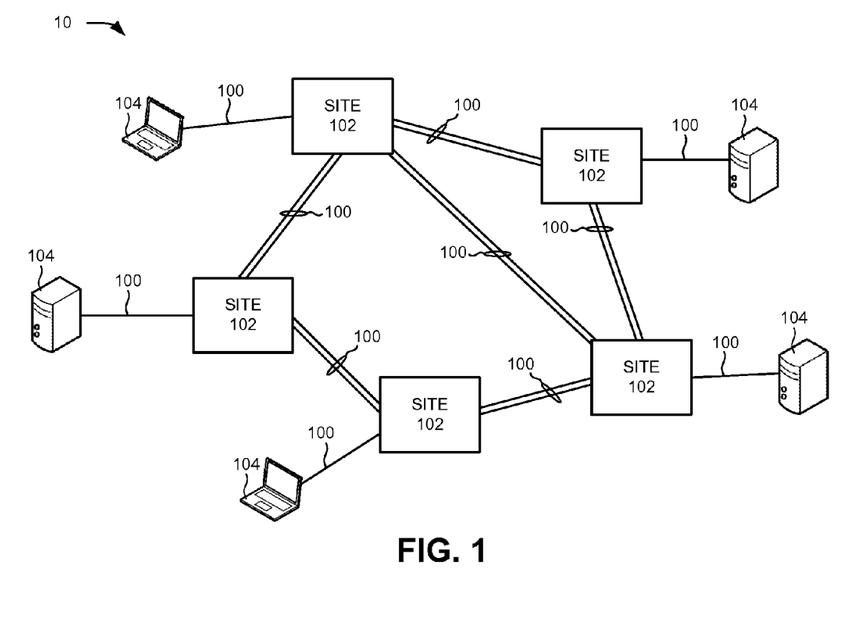
FIG. 1 illustrates an exemplary network in which systems and methods described herein may be implemented.

FIG. 1 is a block diagram illustrating an exemplary communications system 10 in which systems and methods described herein may be implemented. Communications system 10 may include multiple sites 102 connected together by links 100. Links 100 may be implemented using electrical cables, radio or microwave signals, and/or optical fibers and can communicatively couple sites 102 for tens or hundreds of miles. Through these links 100, communications system 10 may carry data signals (e.g., wavelength division multiplexing (WDM) signals) among sites 102 to effectively interconnect data equipment 104 (e.g., computers, remote terminals, servers, etc.). As used herein, links 100 refer to fiber optic links. In the case of fiber optic links, some of links 100 may be configured to provide a number of high speed (e.g., 10 gigabits per second (Gbps)) connections using known WDM techniques. In some implementations, links 100 may be bidirectional links, with each link providing one or more channels in opposite directions simultaneously. Alternatively, some links 100 may be unidirectional links, providing channels between sites 102 in directions opposite to each other.

Signal power across links 100 may need to be adjusted in one or both directions to provide consistent data transfer between sites 102 and/or data equipment 104. In some cases, signals over portions of links 100 will need to be amplified. In other cases, signal strength may be too high for a particular receiver, and attenuation of signals over portions of links 100 may be required. Similarly, power levels of tapped signals from links 100 may also need to be adjusted to meet desired testing/monitoring objectives. According to implementations described herein, in some cases, dynamic attenuation may be used in response to feedback from a particular receiver.

Optical signals transmitted between sites 102 and/or data equipment 104 over links 100 may be monitored to detect network activity, evaluate network performance, and/or provide government-regulated access. In some instances, links 100 may also require troubleshooting and routine testing. Such monitoring and testing may include extracting or injecting information into links 100. Tapping of optical fibers in links 100 provides a technique to enable diverting some of the signal being transmitted in the optical fibers into another fiber. In some contexts, tapping may refer to use of a network test access point (or TAP) to extract signals from network traffic. Some tapping techniques—such as application of thin-film splitters—are effective only for particular operating wavelengths. According to implementations described herein, fused fiber taps (e.g., fused biconic tapers) may be used to provide tapping of links 100 for any wavelength (e.g., different optical wavelength bands, such as IEEE-designated C band, L band, U band, etc.) without wavelength bias. According to implementations described herein, fused fiber taps may also allow for insertion of signals into the optical fibers at the tapping point.

Figure 2:
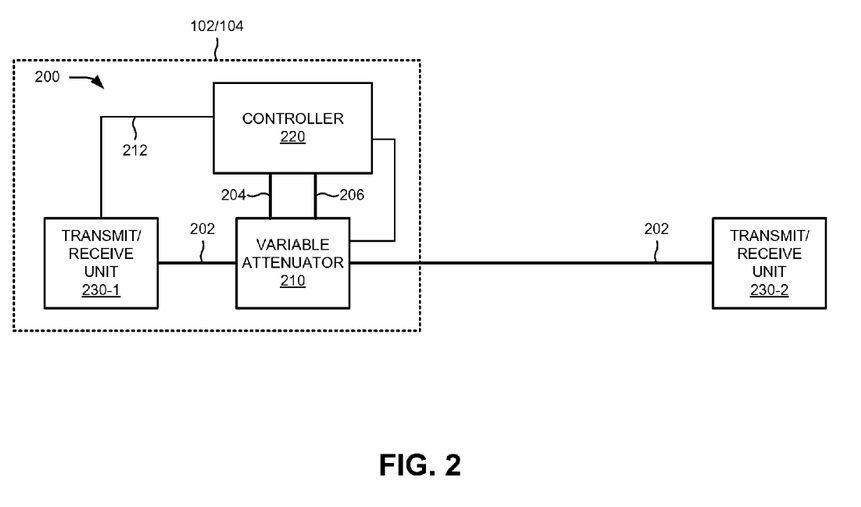
FIG. 2 is a block diagram of an exemplary configuration of a dual directional tapping and dynamic variable optical attenuator system consistent with implementations described herein.

FIG. 2 is block diagram of an exemplary configuration of a dynamic variable optical attenuator system 200 with dual directional tapping (referred to herein as "dynamic attenuator system 200"). Dynamic attenuator system 200 may be co-located, for example, with one of sites 102 or data equipment 104. Dynamic attenuator system 200 may include a variable attenuator 210 and a controller 220 associated with a transmit/receive unit 230. In the configuration of FIG. 2, dynamic attenuator system 200 may be configured to attenuate and/or monitor incoming/outgoing signals of a transmit/receive unit 230-1. Transmit/receive unit 230-1 may be connected via an optical fiber 202 to another transmit/receive unit 230-2, which may be included for example, with a different site 102 or data equipment 104. In one implementation, transmit/receive unit 230-2 may be associated with another dynamic attenuator system 200 (not shown in FIG. 2). In other implementations, more, fewer, or a different arrangement of components may be included in dynamic attenuator system 200. For example, multiple dynamic attenuator systems 200 may be included in a single site 102 (e.g., one dynamic attenuator system 200 for each fiber 202) to accommodate multiple dual direction fibers or an outgoing unidirectional fiber and an incoming unidirectional fiber.

Variable attenuator 210 may be installed in series with an optical fiber 202 that carries live traffic for a portion of optical fiber link 100. Variable attenuator 210 may attenuate the amplitude of an optical signal traversing through optical fiber 202 in relation to an upstream or downstream signal power level. The attenuation may be done at the request of a network administrator (e.g., based on predetermined signal requirements). Alternatively, the attenuation may be performed automatically in response to feedback, such as feedback from transmit/receive unit 230-1.

Transmit/receive unit 230 may be any device configured to transmit, receive and/or process optical data signals, e.g., WDM signals. Transmit/receive unit 230 may correspond to site 102, data equipment 104, or intervening network devices in links 100. In one implementation, transmit/receive unit 230-1 may transmit optical signals that are received by transmit/receive unit 230-2. In other implementations, transmit/receive unit 230-2 may transmit optical signals that are received by transmit/receive unit 230-1. For purposes of this description, signals from transmit/receive unit 230-2 to transmit/receive unit 230-1 may be referred as upstream signals, and signals from transmit/receive unit 230-1 to transmit/receive unit 230-2 may be referred as downstream signals. Both upstream and downstream signals may pass through variable attenuator 210 via optical fiber 202.

Figure 3:
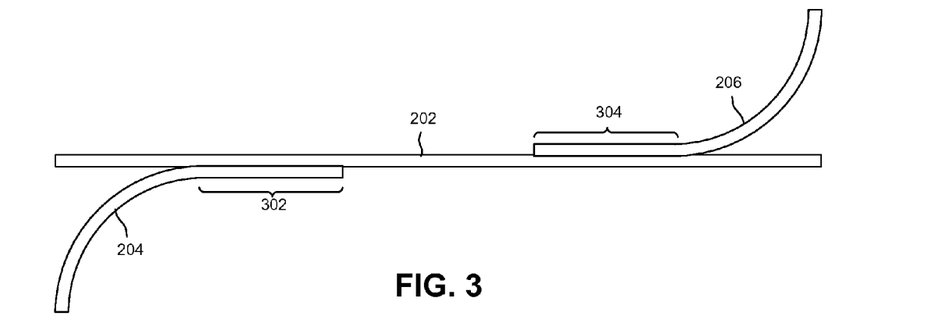
FIG. 3 illustrates a schematic side view of the tapped optical fiber of FIG. 2.

According to implementations described herein, optical fiber 202 may be connected to an upstream traffic tap line 204 and a downstream traffic tap line 206. FIG. 3 illustrates a schematic side view of the tapped optical fiber 202 within variable attenuator 210. Referring to FIG. 3, optical fiber 202 may be composed of two basic concentric glass structures: a core, which carries the light signals, and cladding, which traps the light in the core. In one implementation, optical fiber 202 may be a single mode fiber with a standard diameter of 125 microns. For example, attributes of optical fiber 202 may comply with International Telecommunications Union recommendation ITU-T G.652.D (November 2009). In another implementation, optical fiber 202 may be another type of fiber that may be responsive/sensitive to bending. In some implementations, optical fiber 202 may be provided with a coating, sheath, or jacket (not shown) to protect the core and cladding. This coating, sheath, or jacket would typically be removed from at least a portion of optical fiber 202 within variable attenuator 210 (e.g., the portion of optical fiber 202 shown in FIG. 2) prior to a connecting operation for upstream traffic tap line 204 and downstream traffic tap line 206. Thus, optical fiber 202 may typically include bare fiber. Upstream traffic tap line 204 and downstream traffic tap line 206 may be made from the same or similar materials as those of optical fiber 202.

Upstream traffic tap line 204 may be coupled to optical fiber 202 to form a fused fiber tap 302. Fused fiber tap 302 may be configured, for example, with a one percent or two percent tap ratio for upstream signals traversing optical fiber 202. Similarly, downstream traffic tap line 206 may be coupled to a different portion of optical fiber 202 to form another fused fiber tap 304. Fused fiber tap 304 may be configured, for example, with a one percent or two percent tap ratio for downstream signals traversing optical fiber 202. Fused fiber tap 302 and fused fiber tap 304 may generally provide for signal tapping that may be used to provide tapping of any signal wavelength through optical fiber 202 without wavelength bias.

Fused fiber tap 302 and fused fiber tap 304 may divert some (e.g., one percent or more) of the signal being transmitted via optical fiber 202 into upstream traffic tap line 204 and downstream traffic tap line 206, respectively. Fused fiber tap 302 and fused fiber tap 304 may extract sufficient light, for example, to identify if a signal is present in optical fiber 202. In other instances, it may be necessary to increase the signal power through upstream traffic tap line 204 and/or downstream traffic tap line 206 for other monitoring/testing purposes. As shown in FIG. 2, upstream traffic tap line 204 and downstream traffic tap line 206 may feed into controller 220.

Figure 4A:
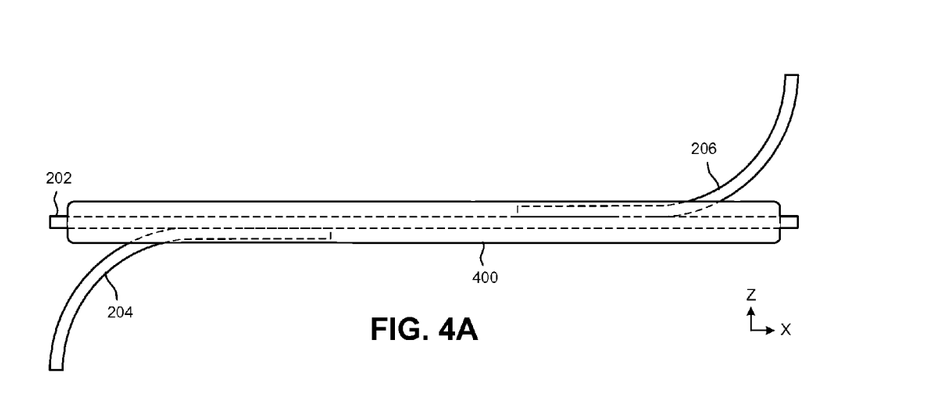
FIGS. 4A, 4B, and 4C illustrate a schematic side view, top view, and end cross-section view of the tapped optical fiber of FIG. 2 with an applied flat coating.
Figure 4B:
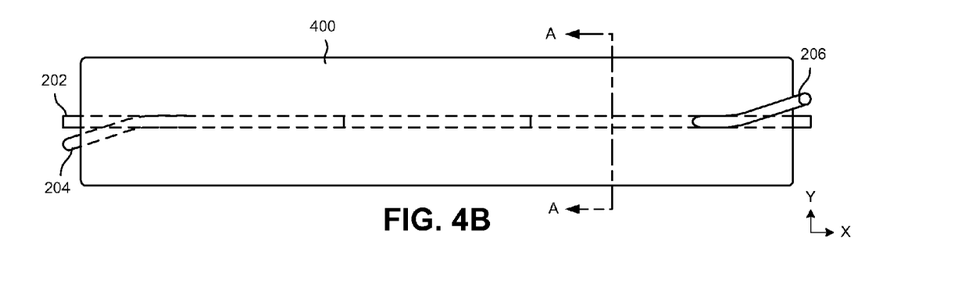
Figure 4C:
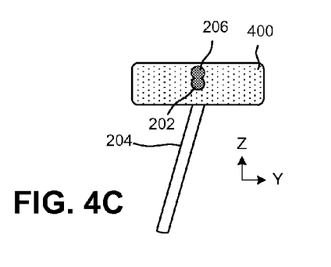

FIGS. 4A and 4B illustrates a schematic side view and top view, respectively, of the tapped optical fiber 202 with an applied flat coating 400. FIG. 4C provides a cross-sectional view along section A-A of FIG. 4B. Referring collectively to FIGS. 4A-4C, flat coating 400 may be applied, for example, after upstream traffic tap line 204 and downstream traffic tap line 206 have been applied to optical fiber 202. In one implementation, flat coating 400 may include one more materials of those used in a conventional protective coating. For example, flat coating 400 may include a soft plastic material such as a UV-cured, urethane acrylate. Flat coating 400 may have an essentially rectangular cross-section. As described further herein, flat coating 400 may permit bending of optical fiber 202, upstream traffic tap line 204, and/or downstream traffic tap line 206 while preventing rotation of optical fiber 202, upstream traffic tap line 204, and/or downstream traffic tap line 206 within variable attenuator 210. More particularly, flat coating 400 may permit bending of fused fiber tap 302 and fused fiber tap 304 in a single plane (a plane defined by the X- and Z-axes of FIG. 4A).

Referring again to FIG. 2, variable attenuator 210 may switch between a radiation mode to adjust for optimal traffic flow through optical fiber 202 and a tapping mode to adjust the tapping power to/from upstream traffic tap line 204 and/or downstream traffic tap line 206. As described further herein, variable attenuator 210 may generally control a bend radius of fused fiber tap 302 and a bend radius of fused fiber tap 304 to independently change signal power for optical fiber 202, upstream traffic tap line 204, and/or downstream traffic tap line 206.

Controller 220 may include a microprocessor, computer, workstation, or other type of processor for controlling the operation of variable attenuator 210. Controller 220 may receive and monitor signals from upstream traffic tap line 204 and downstream traffic tap line 206. Controller 220 (or portions thereof) may generally be positioned locally with respect to variable attenuator 210, such that upstream traffic tap line 204 and downstream traffic tap line 206 can be relatively short optical fibers (e.g., not more than several feet). Controller 220 may also collect direct or indirect feedback from transmit/receive unit 230-1 and/or transmit/receive unit 230-2 (e.g., relating to signal strength for signals between transmit/receive unit 230-1 and transmit/receive unit 230-2). For example, transmit/receive unit 230-1 may use a feedback channel 212 to provide signal feedback. In one implementation, controller 220 may control variable attenuator 210 to automatically adjust optical power leakage at fused fiber tap 302 and/or fused fiber tap 304 to provide desired attenuation across optical fiber 202. In another implementation, controller 220 may control variable attenuator 210 to automatically adjust optical power leakage at fused fiber tap 302 and/or fused fiber tap 304 to provide desired power for a particular tapping function (or cessation of particular functions).

In still another implementation, controller 220 may inject signals into either upstream traffic tap line 204 or downstream traffic tap line 206 to monitor or amplify signals through optical fiber 202. For example, controller 220 may inject optical time-domain reflectometer (OTDR) signals, signals for Bit Error Rate (BER) testing, signals for Optical Signal-to-Noise Ratio (OSNR) testing, etc. As another example, controller 220 may be used to boost power, for signals traversing optical fiber 202, via a Raman amplifier (e.g., using co-directional pumping or contra-directional pumping of a secondary signal through upstream traffic tap line 204 or downstream traffic tap line 206).

Although FIG. 2 illustrates exemplary functional components of dynamic attenuator system 200, in other implementations dynamic attenuator system 200 may include additional, fewer, or different functional components. For example, some functions of controller 220 may alternatively be provided via dedicated components for testing, monitoring, or amplification.

Figure 5:
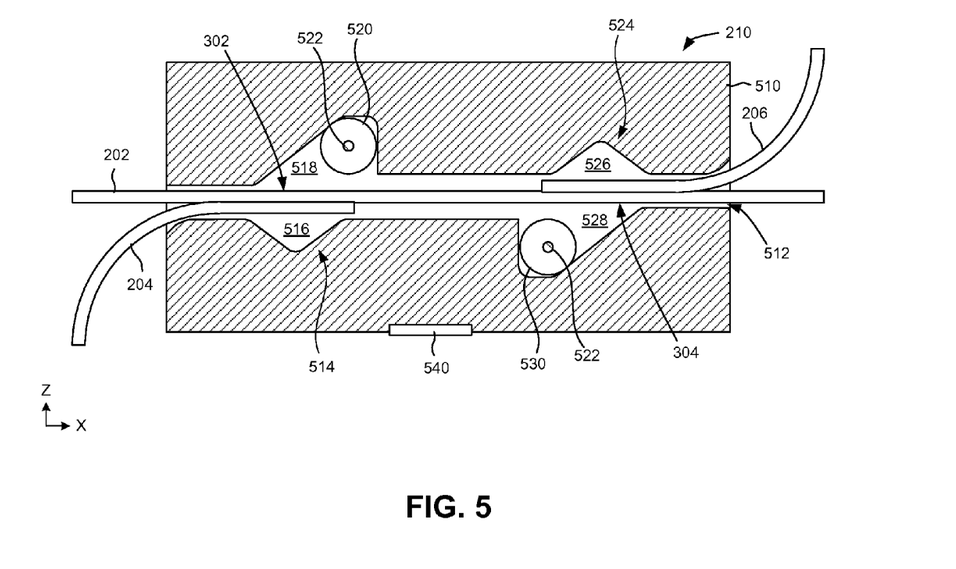
FIGS. 5 and 6 illustrate simplified schematic cross-sectional views of the attenuator of FIG. 2, according to an implementation.
Figure 6:
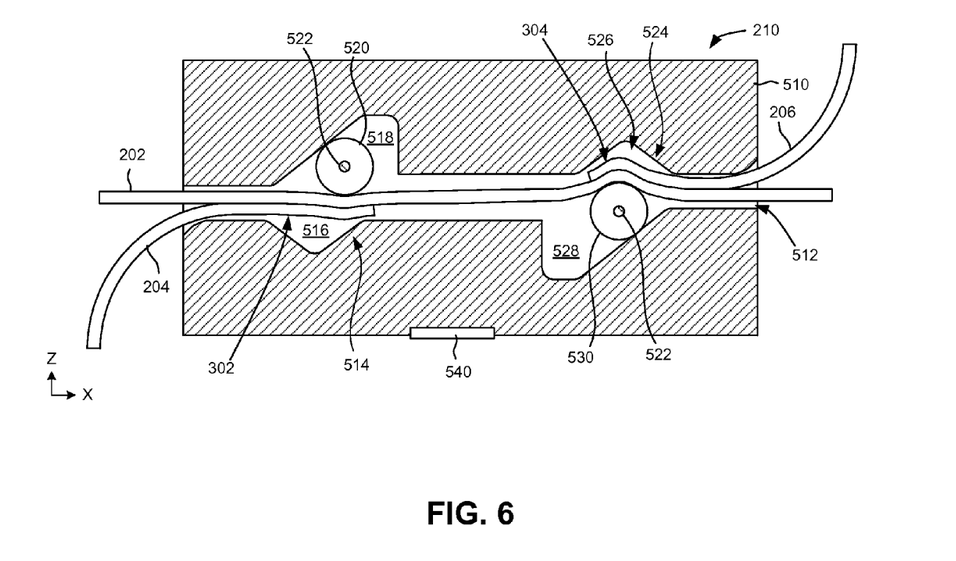

FIGS. 5 and 6 illustrate schematic cross-sectional views of variable attenuator 210, according to an implementation. Variable attenuator 210 may include a housing 510 with a fiber channel 512, an upstream tap bend control region 514, and a downstream tap bend control region 524. Fiber channel 512 may receive optical fiber 202 prepared with flat coating 400. In the simplified views of FIGS. 5 and 6, flat coating 400 is not shown for clarity. In positioning optical fiber 202 within variable attenuator 210, fused fiber tap 302 may be aligned with upstream tap bend control region 514, and fused fiber tap 304 may be aligned with downstream tap bend control region 524.

Housing 510 may generally be formed from a metal material with good thermally conductive properties, such as titanium. In one implementation, housing 510 may act as a heat sink for optical fiber 202, upstream traffic tap line 204, and downstream traffic tap line 206. In another implementation, housing 510 may include one or more sensors 540 to detect a temperature (or a temperature change) in housing 510.

Upstream tap bend control region 514 may include a deflection area 516, a roller path 518, and a roller 520. Similarly, downstream tap bend control region 524 may include a deflection area 526, a roller path 528, and a roller 530. Rollers 520/530 may be similarly configured. Each of rollers 520/530 may generally include a cylindrical roller with a smooth outside surface and an axle 522. In one implementation, rollers 520/530 may be made from the same material as housing 510, such as titanium. In another implementation, rollers 520/530 may be formed from different materials or combinations of materials than housing 510. For example, rollers 520/530 may be made from a ceramic material or coated with silicone. Rollers 520/530 may be sized to form a minimum bend radius for fused fiber tap 302 and fused fiber tap 304. Thus, the diameter of rollers 520/530 may correspond to a particular fiber diameter of optical fiber 202, upstream traffic tap line 204, and downstream traffic tap line 206. The width (e.g., axial length) of rollers 520/530 may be at least equal to the diameter of optical fiber 202.

As shown in FIG. 6, roller 520 may move along roller path 518 and contact fused fiber tap 302 to apply a controlled bend. More particularly, roller 520 may push against optical fiber 202 at fused fiber tap 302, forcing fused fiber tap 302 to bend into deflection area 516. Similarly, roller 530 may move along roller path 528 and contact fused fiber tap 304 to apply a different controlled bend. More particularly, roller 530 may push against optical fiber 202 at fused fiber tap 304, forcing fused fiber tap 304 to bend into deflection area 526. Flat coating 400 (not shown in FIG. 5) may help to maintain bending of fused fiber tap 302 and fused fiber tap 304 in a single plane (e.g., a plane orthogonal to axes 522). However, flat coating 400 may allow for compression/tension of optical fiber 202, upstream traffic tap line 204, and downstream traffic tap line 206 to permit bending at, for example, upstream tap bend control region 514 and downstream tap bend control region 524. The amount of bending of fused fiber tap 302 and the amount of bending of fused fiber tap 304 may be independent of each other.

Movement of rollers 520/530 within roller paths 518/528 may be controlled by manual or motor-operated techniques. Movement of rollers 520/530 may be incremental or continuously variable. Movement of rollers 520/530 may also be independent of each other. Controller 220, for example, may use motors to apply different bend radii at fused fiber tap 302 and fused fiber tap 304 based on tapping signal samples and/or feedback from transmit/receive unit 230-1 and/or transmit/receive unit 230-2. In another implementation, one or both of rollers 520/530 may be manually adjusted to achieve a desired bend radius and held in place with a locking mechanism. In some applications, it may be desirable to apply a bend to only one of fused fiber tap 302 or fused fiber tap 304 at a given time.

In one implementation, the bend radius applied to fused fiber tap 302 or fused fiber tap 304 may be controlled based on, for example, the amount of signal power desired for the receiving transmit/receive unit 230. Variable attenuator 210 may dynamically increase the bend radius of fused fiber tap 302 or fused fiber tap 304 to adjust signal power through optical fiber 202 in a particular upstream of downstream direction. Generally the bend radius of fused fiber tap 302 or fused fiber tap 304 may range from 15 mm to 3 mm.

In another implementation, the bend radius applied to fused fiber tap 302 or fused fiber tap 304 may be controlled based on, for example, a desired tapping signal power. For example, fused fiber tap 302 and fused fiber tap 304 may be configured, for example, with a one percent tap ratio for a straight orientation. Variable attenuator 210 may dynamically increase the bend radius of fused fiber tap 302 or fused fiber tap 304 to adjust the signal power (or tap power ratio) through upstream traffic tap line 204 or downstream traffic tap line 206. In one implementation, the tapping signal strength for fused fiber tap 302 or fused fiber tap 304 may be adjustable from one percent up to at least ten percent of the signal strength of optical fiber 202 in the either direction.

With a smaller bend radius (e.g., a tighter bend), more light may radiate from optical fiber 202. The radiated signal may be absorbed as heat by housing 510, which may be detected by thermal sensors 540. In one implementation, the thermal sensors 540 may be used to detect when traffic is passing through optical fiber 202. In another implementation, the thermal sensors 540 may be used to detect when an applied bend radius is too small, based on a measure of heat radiated into housing 510.

Figure 7:
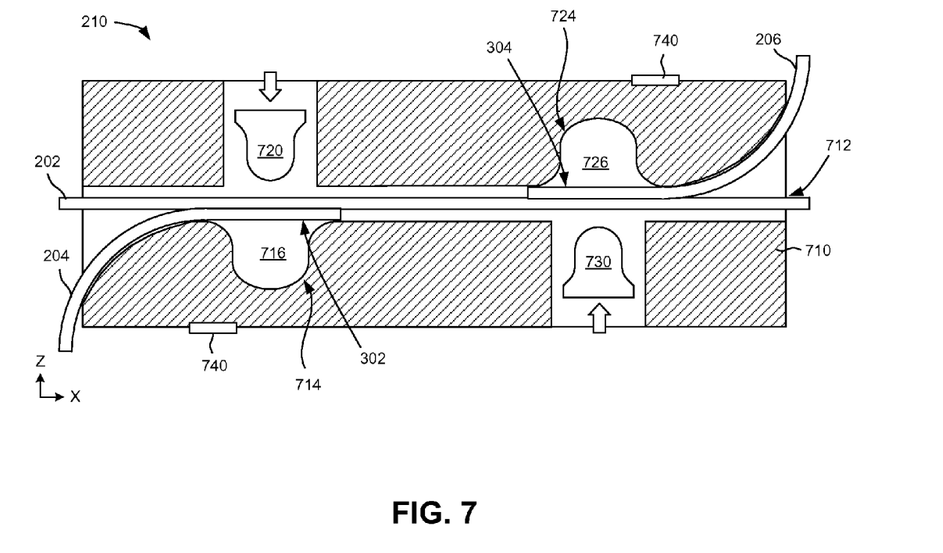
FIGS. 7 and 8 illustrate simplified schematic cross-sectional views of the attenuator of FIG. 2, according to another implementation.
Figure 8:
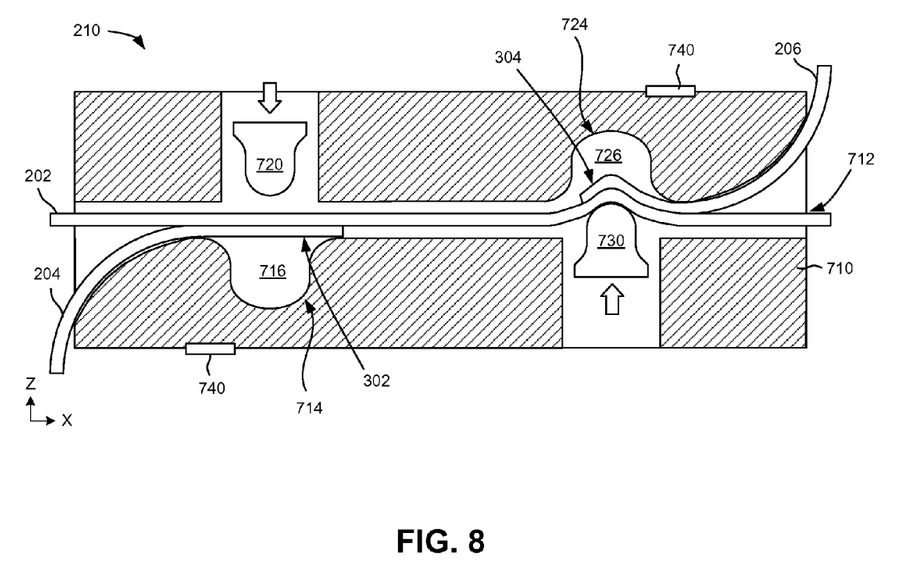

FIGS. 7 and 8 illustrate simplified schematic cross-sectional views of variable attenuator 210, according to another implementation. As shown in FIGS. 7 and 8, variable attenuator 210 may include a housing 710 with a fiber channel 712, an upstream tap bend control region 714, and a downstream tap bend control region 724. Fiber channel 712 may receive optical fiber 202 prepared with flat coating 400. In the simplified views of FIGS. 7 and 8, flat coating 400 is not shown for clarity. In positioning optical fiber 202 within variable attenuator 210, fused fiber tap 302 may be aligned with upstream tap bend control region 714, and fused fiber tap 304 may be aligned with downstream tap bend control region 724.

Housing 710 functions similarly to housing 510 described above. Upstream tap bend control region 714 may include a deflection area 716 and a plunger 720. Similarly, downstream tap bend control region 724 may include a deflection area 726 and a plunger 730. Plungers 720/730 may be similarly configured. Each of plungers 720/730 may generally include a semi-cylindrical surface oriented toward fused fiber tap 302 or fused fiber tap 304, respectively. In one implementation, plungers 720/730 may be made from the same materials as rollers 520/530 described above. Similar to rollers 520/530, plungers 720/730 may be sized to form a minimum bend radius for fused fiber tap 302 and fused fiber tap 304. Rollers 520/530 and plungers 720/730 may be collectively referred to herein as "bend-inducing objects." Housing 710 may also include one or more thermal sensors 740 which provide feedback to controller 220.

As shown in FIG. 8, plunger 730 may move toward fused fiber tap 304 and contact fused fiber tap 304 to apply a controlled bend. More particularly, plunger 730 may push against downstream traffic tap line 206 at fused fiber tap 304, forcing fused fiber tap 304 to bend into deflection area 726. Flat coating 400 (not shown) may help to maintain bending of fused fiber tap 304 in a single plane. In one implementation, plunger 720 may apply a controlled bend to fused fiber tap 302 independently of plunger 730.

Figure 9:
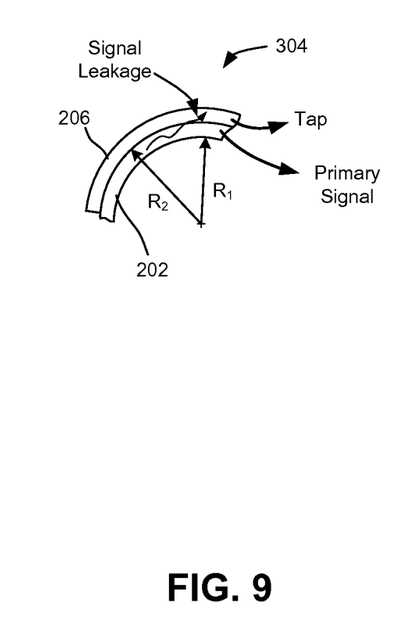
FIG. 9 illustrates an enlarged schematic of a portion of fused fiber tap with a bend radius.

FIG. 9 illustrates an enlarged schematic of a portion of fused fiber tap 304. Fused fiber tap 302 may work similarly. In FIG. 9, fused fiber tap 304 is shown with a first bend radius, $R_1$, for optical fiber 202 and a second bend radius, $R_2$, for downstream traffic tap line 206. Bend radii $R_1$ and $R_2$ may be infinitely large when optical fiber 202 and downstream traffic tap line 206 are in a straight (unbent) orientation. In the orientation of FIG. 9, when one of bend-inducing objects (e.g., roller 530) forces fused fiber tap 304 into deflection area 526 (FIG. 6), the value of $R_1$ and $R_2$ may decrease. The bending of optical fiber 202 may cause downstream signal leakage from optical fiber 202 into downstream traffic tap line 206. The minimum bend radius for fused fiber tap 304 may be based on $R_1$ depending on the mode (e.g., radiation mode or tapping mode) applied by variable attenuator 210 and/or the orientation of the bend-inducing object to the fibers in a fused fiber tap (e.g., fused fiber tap 302/304). For example, in radiation mode, where tapping signal strength may not be a governing factor, $R_1$ may indicate the relevant bend radius for achieving attenuation of a signal through optical fiber 202. Conversely, in tapping mode, $R_1$ may indicate the relevant bend radius for achieving signal leakage from optical fiber 202 for a desired tapping signal strength in downstream traffic tap line 206.

Figure 10:
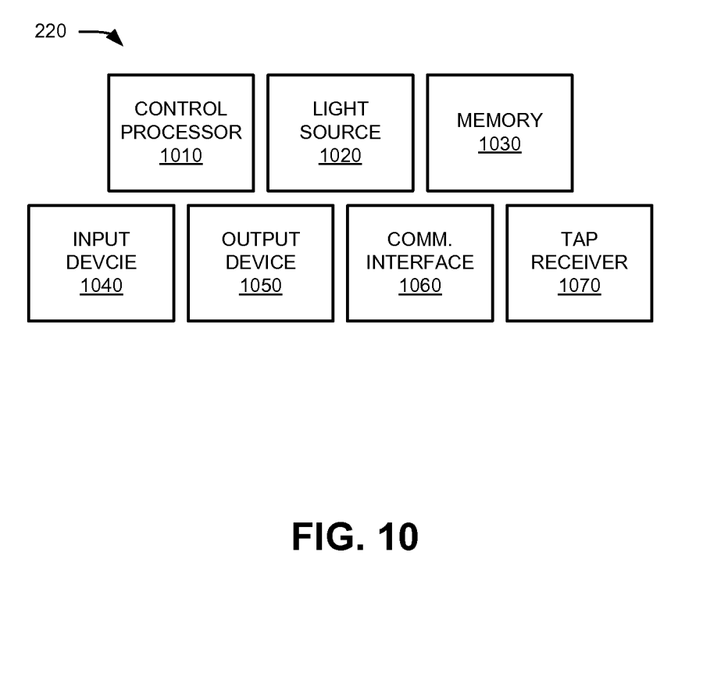
FIG. 10 is a block diagram illustrating functional components of the controller of FIG. 2.

FIG. 10 is a block diagram illustrating exemplary functional components of controller 220. As shown, controller 220 may include a control processor 1010, a light source 1020, a memory 1030, an input device 1040, an output device 1050, a communications interface 1060, and a tap receiver 1070.

Control processor 1010 may include an embedded microprocessor, a computer, a workstation, or another type of processor for controlling the operation of controller 220. In one implementation, control processor 1010 may be configured to receive a user selection corresponding to radiation mode or tapping mode, and configuration settings. For example, control processor 1010 may receive setting/configurations for optimal signal strength for traffic through optical fiber 202. Additionally, or alternatively, control processor 1010 may receive settings/configurations for signal strength of tapped signals through upstream traffic tap line 204 or downstream traffic tap line 206. Control processor may also receive feedback from transmit/receive unit 230 and, in response, dynamically adjust a bend radius (e.g., radius $R_1$) of optical fiber 202 within variable attenuator 210, so as to provide a signal that conforms to the configuration settings. In another implementation, control processor may be configured to receive a user selection corresponding to an underlying network protocol and/or bitrate for testing. Exemplary network protocols and bitrates include gigabit Ethernet (GE), 10 gigabit Ethernet (10GE), optical transport unit-2 extended (OTU2e), optical carrier (OC)-48, 192, and 768, etc. Exemplary bitrates may range from 1.25 Gbps to 11.09 Gbps depending on the selected protocol.

Light source 1020 may include, for example, an erbium doped fiber light source (i.e., a laser) that emits an output signal or output pulses in a broadband spectrum. In some embodiments, light source 1020 may include a distributed feedback (DFB) semiconductor laser or a vertical cavity surface emitting laser (VCSEL) that enables wavelength tuning through adjustments to a temperature of the laser device. In response to an instruction from control processor 1010, light source 1020 may output one or more pulses of high instantaneous power light at a particular pulse width and frequency.

Memory 1030 may include a random access memory (RAM) or another type of dynamic storage device that may store information and instructions for execution by control processor 1010. In other embodiments, memory 1030 may include a ROM device or another type of static storage device that may store static information and/or instructions for use by control processor 1010.

Input device 1040 may include a device or combination of devices that permits a user to input information to controller 220, such as a keypad, one or more dials, a keyboard, a mouse, a pen, a microphone, etc. Input device 1040 may be used in combination with output device 1050 to facilitate entry of a desired function or wavelength value for variable attenuator 210. For example, input device 1040 may include a selector to input a desired attenuation level, which can be achieved via a particular bend radius or incremental bend increase/decrease. Output device 1050 may include a display, a printer, a speaker, and/or another type of output device.

Communications interface 1060 may include a transceiver that enables controller 220 to communicate with other devices and/or systems. For example, communication interface 1060 may include mechanisms for communicating with other devices, such as variable attenuator 210 or other devices (e.g., transmit/receive unit 230) that may collect data from optical fiber 202, upstream traffic tap line 204, and downstream traffic tap line 206. Each of such other devices may include its respective communication interface 1060 to achieve such communication.

Tap receiver 1070 may receive and/or process optical data signals from upstream traffic tap line 204 or downstream traffic tap line 206. In one implementation, tap receiver 1070 may convert optical signals to electrical signals. In another implementation, tap receiver 1070 may register a signal strength, presence, and/or direction of signals upstream traffic tap line 204 or downstream traffic tap line 206.

Figure 11:
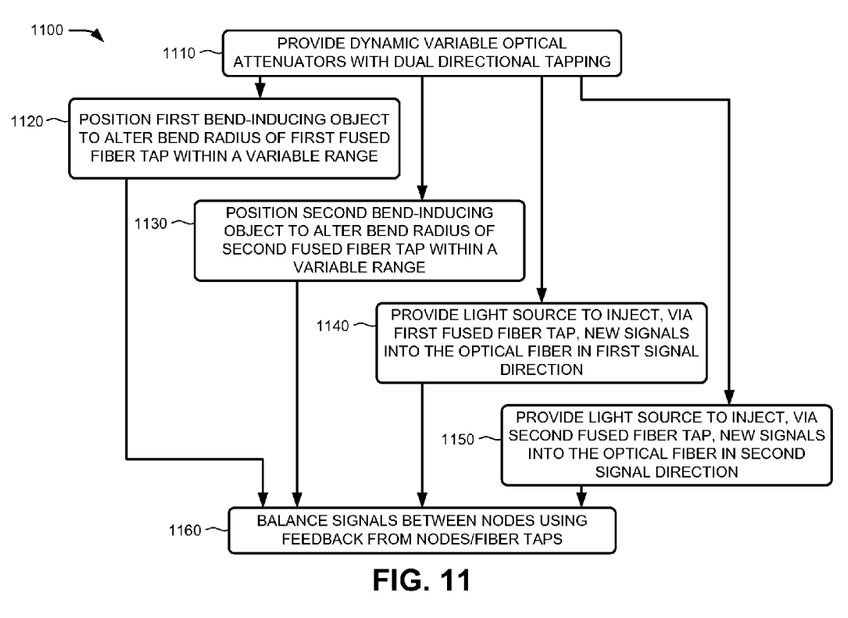
FIG. 11 is a flow diagram of an exemplary a process for implementing duel direction tapping and dynamic variable optical attenuation according to an implementation described herein.

FIG. 11 is a flow chart of a process 1100 for implementing dynamic variable optical attenuation with duel direction tapping according to an implementation described herein. Process 1100 may include providing dynamic variable optical attenuators with dual directional tapping (block 1110). For example, dynamic attenuator systems 200 may be provided for each site 102 and/or data equipment 104 in environment 10. Each dynamic attenuator system 200 may include variable attenuator 210 and controller 220 for a transmit/receive unit 230.

Process 1100 may also include positioning a first bend-inducing object to alter a bend radius of first fused fiber tap within a variable range (block 1120) and positioning a second bend-inducing object to alter a bend radius of second fused fiber tap within a variable range (block 1130). For example, as shown in FIG. 6, for each dynamic attenuator system 200, roller 520 of variable attenuator 210 may be moved to selectively contact fused fiber tap 302 at upstream tap bend control region 514, forcing fused fiber tap 302 into deflection area 516 and altering (e.g., decreasing) the bend radius of fused fiber tap 302. Similarly, roller 530 of variable attenuator 210 may be moved to selectively contact fused fiber tap 304 at downstream tap bend control region 524, forcing fused fiber tap 302 into deflection area 526 and altering (e.g., decreasing) the bend radius of fused fiber tap 304. The bend radius of fused fiber tap 302 and the bend radius of fused fiber tap 304 may be different. Furthermore, blocks 1120 and 1130 may be performed simultaneously or at different times. In one implementation, block 1120 may be performed when roller 530 is disengaged from fused fiber tap 304, and block 1130 may be performed when roller 520 is disengaged from fused fiber tap 302.

Process 1100 may further include providing a light source to inject, via a first fused fiber tap, new signals into the optical fiber in a first signal direction (block 1140), and providing a light source to inject, via a second fused fiber tap, new signals into the optical fiber in a second signal direction (block 1150). For example, for each dynamic attenuator system 200, controller 220 may inject signals into either upstream traffic tap line 204 or downstream traffic tap line 206 to monitor or amplify signals through optical fiber 202. For example, controller 220 may inject optical time-domain reflectometer (OTDR) signals, signals for Bit Error Rate (BER) testing, signals for Optical Signal Noise Ratio (OSNR) testing, etc.

Process 1100 may further include balancing signals between nodes using feedback from the nodes and/or fiber taps (block 1160). For example, controller 220 at one node (e.g., site 102/data equipment 104) may receive feedback from a local transmit/receive unit 230 (e.g., transmit/receive unit 230-1) and, in response, dynamically adjust a bend radius of optical fiber 202 at fused fiber tap 302 and/or fused fiber tap 304 within a local variable attenuator 210. Controller 220 may, for example, adjust incoming and outgoing signals to provide signals that conform to signal strength configuration settings. Additionally, controller 220 may receive tapped signals from upstream traffic tap line 204 or downstream traffic tap line 206 and adjust a fiber tap signal strength (e.g., for upstream traffic tap line 204 or downstream traffic tap line 206). Another controllers 220 at another node (e.g., site 102/data equipment 104) may similarly receive feedback from a local transmit/receive unit 230 (e.g., transmit/receive unit 230-2) and, in response, dynamically adjust a bend radius of optical fiber 202 at fused fiber tap 302 and/or fused fiber tap 304 within another local variable attenuator 210.

As described above, systems may include an attenuator and an optical fiber for transmitting signals in upstream and downstream directions. The optical fiber may include a first fused fiber tap for the upstream signal direction and a second fused fiber tap for the downstream signal direction. The attenuator may include a housing that forms a channel to receive the optical fiber. The attenuator device may also include (a) a first bend control region, in series with the channel and aligned with the first fused fiber tap; (b) a first bend-inducing object that moves to selectively contact the first fused fiber tap in the first bend control region to alter a bend radius at the first fused fiber tap; (c) a second bend control region, in series with the channel and aligned with the second fused fiber tap; and (d) a second bend-inducing object that moves to selectively contact the second fused fiber tap in the second bend control region to alter a bend radius at the second fused fiber tap. The systems may also include a controller to receive and monitor signals from the first fused fiber tap and the second fused fiber tap.

Systems described herein may enable dynamic variable attenuation of signals through fiber links using feedback. The same system can also be used to provide bi-direction signal tapping and monitoring. The same system can also be used to tune tapping signal strength starting at one percent, up to ten percent or more. The systems may inject signals in both upstream and downstream directions for purposes of monitoring, testing, control, or amplification.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, while series of blocks have been described with respect to FIG. 11, the order of the blocks may be modified in other implementations. Further, non-dependent blocks may be performed in parallel.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

What is claimed is:
1. An attenuator device, comprising:
a housing that forms a channel to receive an optical fiber, the optical fiber including a first fused fiber tap for a first signal direction in the optical fiber and a second fused fiber tap for a second signal direction in the optical fiber;

a first tap bend control region, in series with the channel and configured to align with the first fused fiber tap;

a first bend-inducing object that moves to selectively contact the first fused fiber tap in the first tap bend control region to alter a bend radius at the first fused fiber tap;

a second tap bend control region, in series with the channel and configured to align with the second fused fiber tap; and a second bend-inducing object that moves to selectively contact the second fused fiber tap in the second tap bend control region to alter a bend radius at the second fused fiber tap.

2. The attenuator device of claim 1, wherein the housing includes a metal material, the attenuator device further comprising:

a thermal sensor to detect a temperature change in the housing.

3. The attenuator device of claim 1, wherein the first tap bend control region includes a first deflection area into which the first fused fiber tap bends, and wherein the second tap bend control region includes a second deflection area into which the second fused fiber tap bends.

4. The attenuator device of claim 1, wherein the first bend-inducing object moves independently from the second bend-inducing object.

5. The attenuator device of claim 1, wherein the first fused fiber tap:

receives a percentage of signal power from the optical fiber in the first signal direction, and injects new signals into the optical fiber in the second signal direction.

6. The attenuator device of claim 5, wherein the second fused fiber tap:

receives a percentage of signal power from the optical fiber in the second signal direction, and injects other new signals into the optical fiber in the first signal direction.

7. The attenuator device of claim 6, wherein the new signals and the other new signals include one or more of:

instruction signals, or monitoring signals.

8. The attenuator device of claim 1, wherein a tapping signal strength for the first fused fiber tap is adjustable from one percent up to at least ten percent of the signal strength of the optical fiber in the first direction.

9. The attenuator device of claim 8, wherein a tapping signal strength for the second fused fiber tap is adjustable from one percent up to at least ten percent of the signal strength of the optical fiber in the second direction.

10. An attenuator system, comprising:

an optical fiber for transmitting signals in a first signal direction and a second signal direction, the optical fiber further including:

a first fused fiber tap for the first signal direction, and a second fused fiber tap for the second signal direction; and an attenuator including:

a housing that forms a channel to receive the optical fiber, a first tap bend control region in series with the channel and aligned with the first fused fiber tap, a first bend-inducing object that moves to selectively contact the first fused fiber tap in the first tap bend control region to alter a bend radius at the first fused fiber tap, a second tap bend control region in series with the channel aligned with the second fused fiber tap, and a second bend-inducing object that moves to selectively contact the second fused fiber tap in the second tap bend control region to alter a bend radius at the second fused fiber tap.

11. The attenuator system of claim 10, the attenuator further comprising a thermal sensor for the housing.

12. The attenuator system of claim 10, wherein the first tap bend control region includes a deflection area into which the first fused fiber tap bends and a bend-inducing object path to permit controlled movement of the first bend-inducing object.

13. The attenuator system of claim 10, the optical fiber being a 125 micron diameter bare fiber.

14. The attenuator system of claim 10, the housing including a metal material.

15. The attenuator system of claim 14, the metal material including titanium.

16. The attenuator system of claim 10, further comprising:

a controller to receive and monitor signals from the first fused fiber tap and the second fused fiber tap.

17. The attenuator system of claim 16, further comprising:

a thermal sensor to detect a temperature change in the housing, wherein the controller dynamically adjusts a position of the first bend-inducing object or a position of the second bend-inducing object based on readings from the thermal sensor.

18. The attenuator system of claim 10, the optical fiber further comprising:

a flat coating that limits a bending direction of the optical fiber to a plane.

19. A method, comprising:

providing an attenuator device comprising:

a housing that forms a channel to receive an optical fiber, the optical fiber including a first fused fiber tap for a first signal direction in the optical fiber and a second fused fiber tap for a second signal direction in the optical fiber, a first tap bend control region in series with the channel and configured to align with the first fused fiber tap, a first bend-inducing object that moves to selectively contact the first fused fiber tap in the first tap bend control region to alter a bend radius at the first fused fiber tap, a second tap bend control region in series with the channel configured to align with the second fused fiber tap, and a second bend-inducing object that moves to selectively contact the second fused fiber tap in the second tap bend control region to alter a bend radius at the second fused fiber tap;

positioning the first bend-inducing object to decrease a bend radius of the first fused fiber tap and increase a tapping signal strength of signals in the first signal direction;

positioning the first bend-inducing object to increase the bend radius of the first fused fiber tap and decrease the tapping signal strength; and positioning the second bend-inducing object to decrease a bend radius of the second fused fiber tap and increase a tapping signal strength of signals in the second signal direction.

20. The method of claim 19, further comprising:
injecting, via the first fused fiber tap, new signals into the optical fiber in the second signal direction.

* * * * *